United States Patent [19]
Johnston et al.

[11] Patent Number: 5,344,063
[45] Date of Patent: Sep. 6, 1994

[54] METHOD OF MAKING DIFFUSION BONDED/SUPERPLASTICALLY FORMED CELLULAR STRUCTURES WITH A METAL MATRIX COMPOSITE

[75] Inventors: Stephen H. Johnston; Duncan R. Finch; Brian Ginty, all of Balderstone, England

[73] Assignee: British Aerospace Public Limited Company, Hampshire, United Kingdom

[21] Appl. No.: 951,192

[22] Filed: Sep. 28, 1992

[30] Foreign Application Priority Data

Oct. 4, 1991 [GB] United Kingdom ............... 9121107

[51] Int. Cl.$^5$ .................... B23K 20/00; B23K 31/00
[52] U.S. Cl. .................................. 228/157; 228/193; 228/262.71; 29/889.72
[58] Field of Search ............... 228/157, 190, 193, 121, 228/262.71; 29/889.71, 889.72, 889.721; 428/594

[56] References Cited

U.S. PATENT DOCUMENTS

| | | | |
|---|---|---|---|
| 3,895,436 | 7/1975 | Summers et al. | 228/157 |
| 3,924,793 | 12/1975 | Summers et al. | 228/157 |
| 4,263,375 | 4/1981 | Elrod | 428/594 |
| 4,351,470 | 9/1982 | Swadling et al. | 228/157 |
| 4,422,569 | 12/1983 | Payne et al. | 228/173 |
| 4,469,757 | 9/1984 | Ghosh et al. | 148/535 X |
| 4,534,503 | 8/1985 | Stephen et al. | 228/157 |
| 4,563,812 | 1/1986 | Goddard-Watts | 29/857 |
| 4,607,783 | 8/1986 | Mansbridge et al. | 228/157 |
| 4,632,296 | 12/1986 | Mansbridge et al. | 228/157 |
| 4,822,432 | 4/1989 | Eylon et al. | 148/516 |
| 4,878,369 | 11/1989 | Apps et al. | 72/12 |
| 4,901,552 | 2/1990 | Ginty et al. | 72/60 |
| 4,972,696 | 11/1990 | Apps et al. | 72/9 |
| 4,980,010 | 12/1990 | Ellis et al. | 156/292 |
| 4,989,774 | 2/1991 | Stephen et al. | 228/157 |
| 5,098,011 | 3/1992 | Runyan | 228/243 |
| 5,104,460 | 4/1992 | Smith, Jr. et al. | 148/407 X |
| 5,115,963 | 5/1992 | Yasui | 228/157 |
| 5,141,146 | 8/1992 | Yasui | 228/157 |
| 5,143,276 | 9/1992 | Mansbridge et al. | 228/157 |

FOREIGN PATENT DOCUMENTS 2095137A 9/1982 United Kingdom.

Primary Examiner—P. Austin Bradley
Assistant Examiner—Jeanne M. Elpel
Attorney, Agent, or Firm—Nixon & Vanderhye

[57] ABSTRACT

This invention relates to a process of forming components having selectively thickened regions from superplastically formable and diffusion bondable materials. The said selected thickening is achieved by positioning metal matrix composite plies between the interior surface of each of the formed skin sheets of the component and the sheets which will form the internal cells, superplastically forming the cells, and then diffusion bonding the component to form a metallurgically bonded structure.

6 Claims, 2 Drawing Sheets

METHOD OF MAKING DIFFUSION BONDED/SUPERPLASTICALLY FORMED CELLULAR STRUCTURES WITH A METAL MATRIX COMPOSITE

BACKGROUND OF THE INVENTION

1. Field of the Invention

This invention relates to methods of forming stiffened panels from materials having superplastic characteristics, and more particularly to methods of forming aerospace structural components having an internal cellular structure by the processes of superplastic forming and diffusion bonding.

2. Discussion of Prior Art

Metals having superplastic characteristics, such as titanium and many of its alloys, have a composition and microstructure such that, when heated to within an appropriate range of temperature and when deformed within an appropriate range of strain rate, they exhibit the flow characteristics of a viscous fluid. The condition in which these characteristics are attained is known as superplasticity, and, in this condition, the metals may be deformed so that they they undergo elongations of several hundred percent without fracture or significant necking. This is due to the fine, uniform grain structures of superplastically formable metals which, when in the condition of superplasticity, allow grain boundary sliding by diffusion mechanism so that the individual metal crystals slide relative to one another.

Diffusion bonding is often combined with superplastic forming to enable the manufacture of multi-sheet components of complex structure. The diffusion bonding process concerns the metallurgical surgical joining of surfaces by applying heat and pressure which results in the co-mingling of atoms at the joint interface, the interface as a result becoming metallurgically undetectable. In order to achieve structures of a complex nature it is often a requirement that the multi-sheet metals are not bonded at all their contacting areas, and therefore bond inhibitors (commonly known as stop-off or stopping-off materials) are applied to selected areas by, for example, a silk screen printing process.

One known application using both superplastic forming and diffusion bonding is for forming stiffened components by the following method. Two sheets of superplastically formable and diffusion bondable material which will form the internal structure of the finished component, hereafter referred to as the core sheets, are selectively interlaid with stop-off material. Two further sheets of superplastically formable and diffusion bondable material are positioned on each side of the core sheets; these sheets will form the outer surface of the finished component and are hereafter referred to as the skin sheets. The "pack" of four sheets is then positioned in a form tool and placed in a heated platen press which is heated to 930° C. An inert gas is injected into the space between each skin sheet and its adjacent core sheet. The pressure exerted by this gas causes the skin sheets to bow outwards and conform to the shape of the cavity of the form tool while at the same time causing the core sheets to be diffusion bonded in the areas where stop-off material is not applied. When these steps have been completed, a gas is injected into the spaces between the core sheets where they are not diffusion bonded. The pressure exerted by the gas causes the core sheets to be moved apart and form substantially rectangular cells which occupy the space between the skin sheets. These cells are formed by the continued application of pressure from the gas which causes parts of the surfaces of the core sheets to become parallel and adjacent to the skin sheets and to be diffusion bonded to them to form cell ceilings and floors while at the same time causing other parts of the surfaces of the core sheets, which, due to forming, are now vertically adjacent to one another, to also be diffusion bonded to form cell walls.

Titanium, in sheet form, has in its received state the characteristics needed for superplastic forming, and because it will absorb its own oxide layer at high temperature in an inert atmosphere to provide an oxide-free surface, it is also particularly amenable to diffusion bonding under pressure. The optimum temperature for this self-cleaning is 930 degrees Centigrade which is also the optimum superplastic forming temperature. Thus, superplastic forming and diffusion bonding of titanium components can be carried out at the same time.

The ability to combine superplastic forming (SPF) and diffusion bonding (DB) has enabled our company to design multi-sheet components of complex structure that are essentially of one-piece construction. We have described above the known method of manufacturing titanium cellular structures comprising monolithic skinned panels with a vertical I-section rib/spar internal structure. Such structures have a potential application in aircraft manufacture, for example the manufacture of wing leading and trailing edge control surfaces and canards which must have smooth, aerodynamic skin surfaces and be strong and light in weight.

Many aircraft components require structures of variable gauge. Attachment points on wing sections, for example, often require locally thickened regions.

Previously such thickening or strengthening has been achieved by using uniformly thickened sheets in the multi-sheet SPF/DB process. However, it is then necessary to add an additional, onerous step to the production process of chemical-milling in order to reduce the thickness of the sheets in areas where strengthening is not required. This chemical milling step is time consuming, wasteful of material and produces hazardous waste products.

In our co-pending patent application number GB9103804.2 we describe a method of forming a component in an SPF/DB process with selectively thickened areas in order to obviate the chemical-milling step. The process is essentially the same as that described above, with the exception that the additional step of overlaying and attaching one or more additional sheets of material to the interior surfaces of the skin sheets in areas where extra thickness is required prior to superplastically forming the skin sheets of the pack to the desired shape. In this process the additional sheets are made of the same material as the other sheets of the pack.

As is well known in the field of metallurgy, metal matrix composites based on a particular alloy exhibit qualities of improved tensile strength, wear resistance and hardness relative to the alloy alone. An example of a method of manufacture of a metal matrix composite is given in U.S. Pat. No. 4,968,348 (Abkowitz et al.). Despite their desirable qualities, it has hitherto not been possible to use metal matrix composites in the SPF/DB production process of selectively thickened components because the composites are not superplastically formable.

SUMMARY OF THE INVENTION

An object of the present invention is to provide a method of manufacturing superplastically formed and diffusion bonded components which have thickened areas, the thickening being facilitated by the use of metal matrix composites (MMCs).

According to one aspect of the present invention there is provided a method of manufacturing a component from at least three sheets of material, at least one of which is a superplastically formable sheet, the method including the steps of attaching at least one ply of metal matrix composite (MMC) to a surface of one of two of said at least three sheets of material, said two sheets being substantially formed to a shape required for them in the manufactured component; diffusion bonding one of said at least one superplastically formable sheets of material to the other of said two sheets in selected areas; superplastically forming said superplastic-ally formable sheet when same is positioned between respective ones of said two sheets such that the said superplastically formable sheet bows out and forms a plurality of cells, the shape of which are determined by positions of surfaces consisting of the said two sheets, the MMC ply or plies and the adjacent cell or cells with which they come into contact; and diffusion bonding the superplastically formed cells to said surfaces and said one of two sheets to said MMC ply or plies.

According to another aspect of the invention there is provided a method of manufacturing a component from at least four sheets of material, at least two of which are superplastically formable sheets, the method including the steps of attaching at least one ply of metal matrix composite (MMC) to a surface of one of two of said at least four sheets of material, said two sheets being substantially formed to a shape required for them in the manufactured component; diffusion bonding two of said at least two superplastically formable sheets of material together in selected areas; superplastically forming said two superplastically formable sheets when same are positioned between respective ones of said two sheets such that the said two superplastically formable sheets bow out and form a plurality of cells, the shape of which are determined by positions of surfaces consisting of the said two sheets, the MMC ply or plies and the adjacent cell or cells with which they come into contact; and diffusion bonding the superplastically formed cells to said surfaces and the said one of two sheets to said MMC ply or plies.

Preferably, said two sheets are superplastically formed to a shape required for them in the manufactured component.

Conveniently, the second diffusion bonding step is performed in a hot isostatic press.

Optionally, said MMC comprises continuous silicon carbide (SIC) fibre in titanium-based alloy.

BRIEF DESCRIPTION OF THE DRAWINGS

For a better understanding of the invention, an embodiment of it will now be described by way of example only and, with particular reference to the accompanying drawings, in which.

DETAILED DESCRIPTION OF PREFERRED EMBODIMENTS

Figure 1:
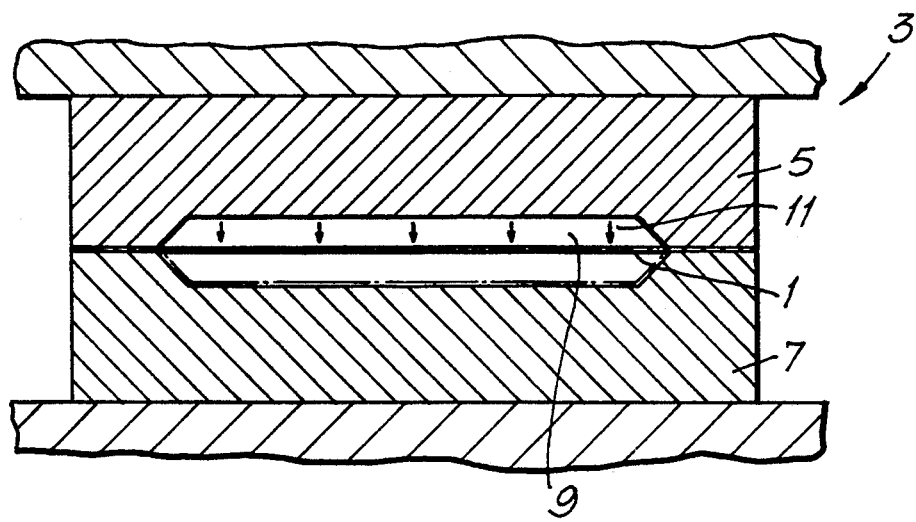
FIG. 1 shows the superplastic forming of a skin sheet.

To improve understanding of the drawings, like elements which appear in more than one figure are designated by the same reference numeral.

FIG. 1 shows a sheet 1 of titanium alloy which is in the process of being superplastically formed in a heated platen press 3. The sheet 1 is positioned between two form tools 5 and 7 which define an internal cavity 9. The press 3 is heated to 930 degrees C. An inert gas is introduced under pressure, as indicated by straight arrows 11, via a suitable gas pipe connection ( not shown ). The superplastic forming process is finished when the sheet 1 corresponds to the shape of the portion of the cavity 9 which is defined by the lower form tool 7. A second sheet 13 is formed in a similar manner either simultaneously or subsequently.

The two sheets 1 and 13 are then cleaned using an acid etch, for example sulphuric and/or chromic acid.

Figure 2:
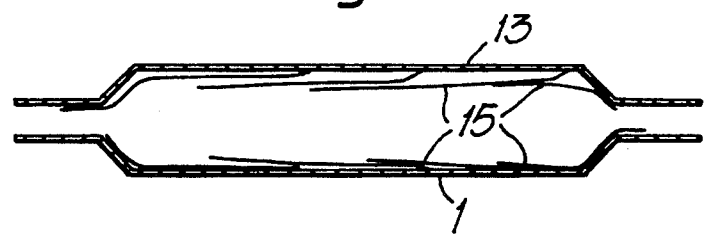
FIG. 2 shows two formed skin sheets to which MMC plies have been attached.

Plies of clean continuous silicon carbide (SiC) fibre 15 in titanium-based alloy metal matrix composite, such as AVCO, are then welded or diffusion bonded onto the interior surfaces of the sheets 1 and 13, these sheets being arranged so as to substantially enclose a space and thus forming the skin sheets of what will ultimately be the finished component (see FIG. 2).

Figure 3:
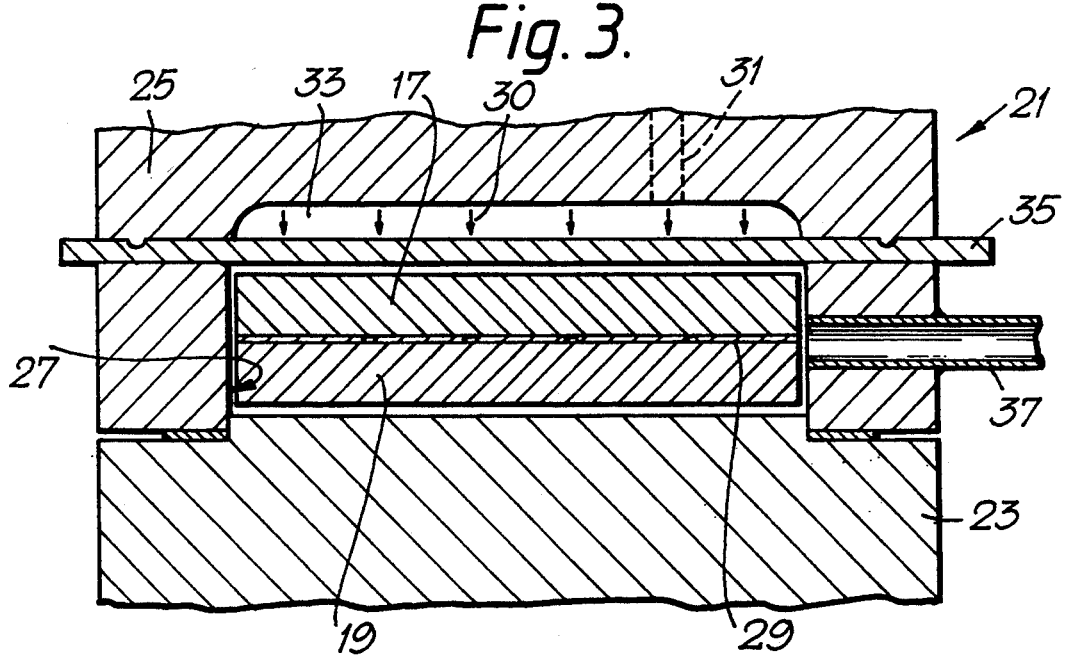
FIG. 3 shows two core sheets being diffusion bonded in a bonding tool.

Core sheets 17 and 19 are prepared as shown in FIG. 3. A tool, shown generally at 21, for diffusion bonding the core sheets includes bottom tool 23 and top tool 25 which together define a cavity 27 in which the core sheets 17 and 19 are positioned. Prior to positioning in the tool 21, sheets 17 and 19 are selectively interlaid with stop-off material 29 which is applied by a known silk screen printing process. The cavity 27 is pressurized by an inert gas {shown by vertical arrows 30 in FIG. 3) from a pipe 31 connected to a pressure pump (not shown). The gas enters space 33 and exerts pressure on a diaphragm 35 made of, for example, supral alloy (which is superplastically formable) which in turn presses on the sheets 17 and 19. A pipe 37 is connected to a vacuum pump (not shown) to evacuate the part of the cavity 27 below the diaphragm 35 containing the pack. Heaters (not shown) are provided in the walls of top tool 25 so that the sheets 17 and 19 can be sufficiently heated so that diffusion bonding occurs in the areas where stop-off material has not been applied when pressure is exerted by the gas from the pump.

Figure 4:
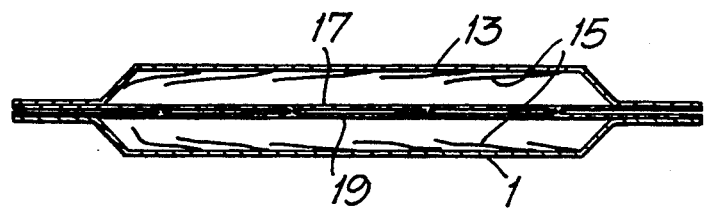
FIG. 4 shows the assembly of a four sheet pack.

As shown in FIG. 4, the bonded core sheets 17 and 19 are positioned between the skin sheets 1 and 13 to form a pack. The pack is then welded around its periphery and gas pipes (not shown) are added to facilitate the management of gas pressure between the adjacent skin and core sheets and between the core sheets themselves.

Figure 5:
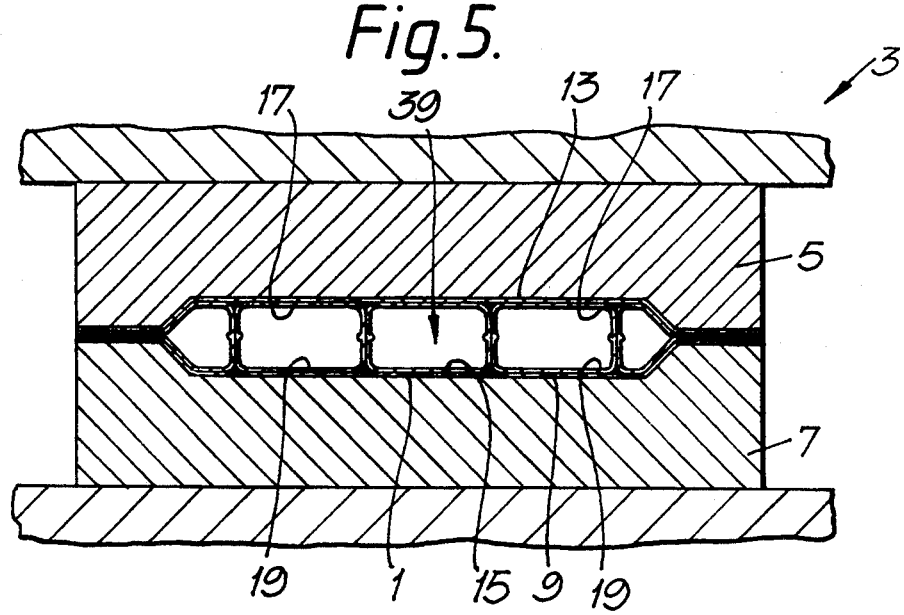
FIG. 5 shows the superplastic forming of the four sheet pack to form a cellular structure.

The pack is then again positioned in the heated platen press 3 as shown in FIG. 5. Pressurised gas is applied to the gas pipes feeding the areas between the core sheets 17 and 19, and the spaces between the diffusion bonds defined by the stopped-off areas 29 are inflated so that they bow outward and form rectangular cells 39. Pairs of opposing walls of the cells 39 form the support walls of the finished component and the interior surfaces (ceilings and floors) of the finished component respectively. The metal matrix composite plies 15 are trapped between the exterior surface of the component and the interior surfaces of the component. Diffusion bonding then occurs between the plies 15 and the exterior and interior surfaces of the component, between the exterior and interior surfaces of the component themselves, and between the adjacent walls of cells 39. This may be done in the heated platen press 3 if sufficient pressure (for example, in excess of 5,000 psi) is available.

Due to the high required pressures, it is preferred to remove the component from the heated platen press 3 and evacuate the regions between the exterior surface and the interior surface of the component via the gas pipes (not shown) and then to seal these gas pipes, thus ensuring that the metal matrix composite plies 15 are in a vacuum. This process is known as encapsulation. The encapsulated component is then subjected to hot isostatic pressing (a technique well known in the field of powder metallurgy) which involves the application of an isostatic pressure to the component while maintaining it at a required constant temperature. This technique enables the required high pressures for diffusion bonding metal matrix composites to be achieved.

When the diffusion bonding process is completed, the atoms of the exterior surface of the component, the metal matrix composite plies 15, the interior sheet and the adjacent walls of the cells 39 of the component are inter-diffused, thus forming metallurgically bonded layers.

Figure 6:
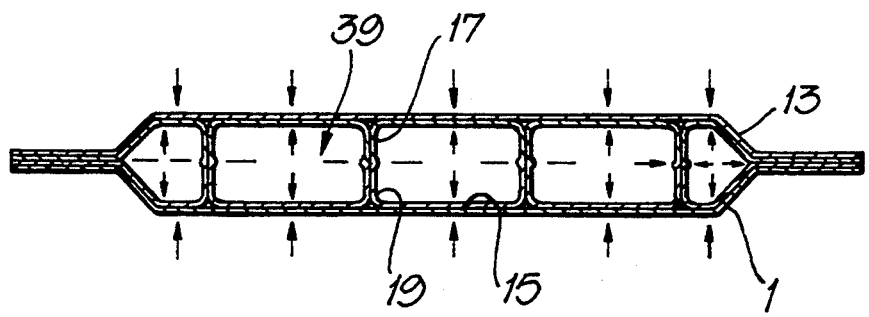
FIG. 6 shows the pack being subjected to hot isostatic pressing.

The arrows in FIG. 6 show the force being exerted by the pressurising gas on the interior and exterior of the component in the hot isostatic press. An advantage of using a hot isostatic press for diffusion bonding is that it obviates the need for using highly stressed form tools. The bonding pressures act isostatically, and therefore do not require mechanical reaction.

As an alternative to diffusion bonding the core sheets 17 and 19 in the tool 21 shown in FIG. 3, this may be achieved in the heated platen press 3 of FIG. 5 by applying a pressurising gas to the areas between the skin sheet 1 and the core sheet 19 and the skin sheet 13 and the core sheet 17 respectively prior to the inflation of the core sheets to form cells 39.

The embodiment described has the advantage that the metal matrix composite plies 15 are diffusion bonded after the skin sheets 1 and 13 of the components are superplastically formed. By doing this, the problems associated with the forming limitations of many metal matrix composites are obviated.

A further advantage of the embodiment described is that the MMC plies are protected from the effects of the atmosphere because they are sealed between the external and internal surfaces of the component.

It should be understood that it is not essential for the skin sheets to be superplastically formable. They may be made from any material which can be formed to the required shape, and to which MMC plies can be attached.

It should be further understood that the invention is also applicable to the manufacture of components from three sheets and from more than four sheets. For example, in the former case only one core sheet is used. After forming the skin sheets, MMC plies are bonded to one of them, and the core sheet is selectively bonded to the other—the pattern of this selective bonding determining where the cells will be formed. The core sheet is then superplastically formed by the application of pressurised gas to form cells, one side of which is defined by the skin sheet to which they were diffusion bonded. The continued application of pressure causes the diffusion bonding of the cell walls to one another, to the MMC plies, and to the skin sheet to which the plies are attached.

We claim:

1. A method of manufacturing a component having an external shape from at least three sheets of material, each of said sheets is a superplastically formable sheet, said method comprising the steps of:
    forming two of said sheets superplastically to said external shape of said component;
    attaching at least one ply of metal matrix composite (MMC) to an inner surface of at least one of said two formed sheets;
    positioning the third of said at least three sheets between the two formed sheets with said formed sheets enclosing a space;
    a first step of diffusion bonding said third sheet to selected areas of said two formed sheets;
    superplastically forming the third sheet to form an internal shape bounded by inner surfaces of said two formed sheets and said at least one ply of MMC; and
    a second step of diffusion bonding said third sheet to at least part of said at least one ply of MMC.

2. A method of manufacturing in accordance with claim 1, wherein said at least three sheets comprise at least four sheets of a superplastically formable material and said positioning step comprises positioning the third and fourth sheets between the two formed sheets, said first diffusion bonding step includes the step of diffusion bonding said third and fourth sheets to selected areas of said two formed sheets and said third and fourth sheets, and said superplastically forming step includes superplastically forming the third and fourth sheets to form an internal shape bounded by inner surfaces of said two formed sheets and said at least one ply of MMC.

3. A method of manufacturing in accordance with claim 2, wherein said superplastically forming step includes the step of providing a gas having a positive pressure between the third and fourth sheets as compared to a pressure surrounding the third and fourth sheets, said positive pressure comprising a step of bowing said third and fourth sheets in opposite directions to form a plurality of cells.

4. A method of manufacturing in accordance with claim 3, wherein after said bowing step, there is included a further diffusion bonding step for bonding said third and fourth sheets to each other at adjacent cell and for bonding said cells to the inner surfaces of said first and second sheets.

5. A method of manufacturing in accordance with claim 1, wherein said second diffusion bonding step is a hot isostatic pressing step.

6. A method of manufacturing in accordance with claim 1, wherein said MMC comprises continuous silicon carbide (SiC) fiber in a titanium-based alloy.

* * * * *